UNITED STATES PATENT OFFICE.

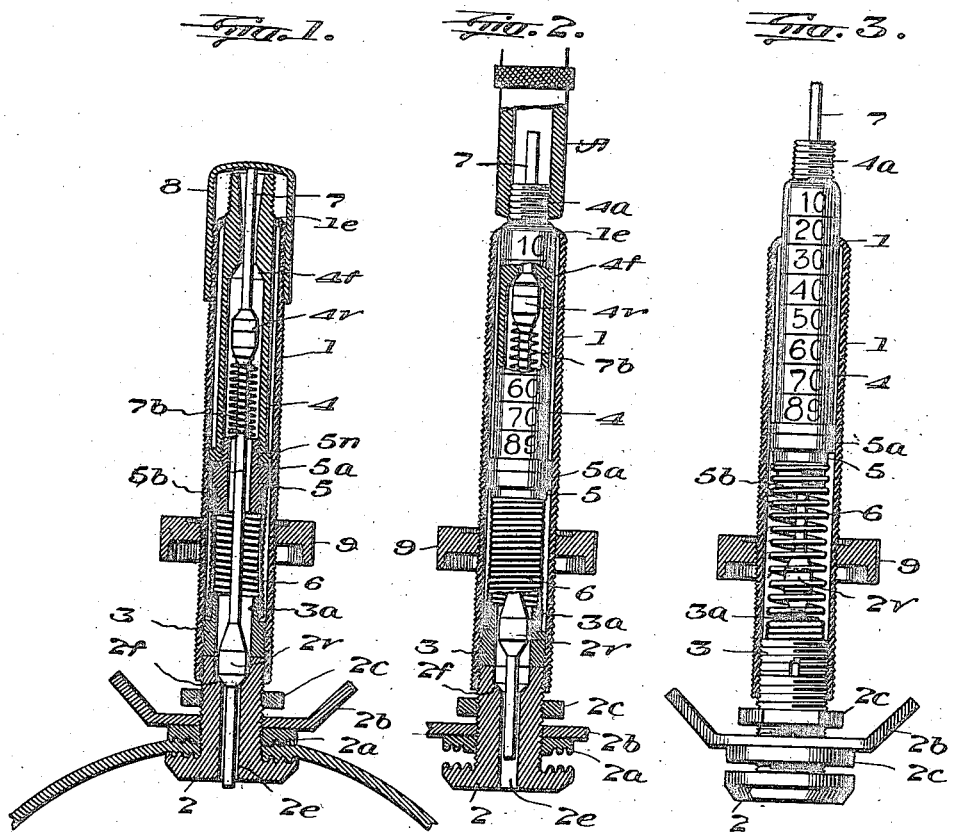

WILLIAM W. LOWER, OF TYRONE, PENNSYLVANIA.

PRESSURE INDICATOR AND VALVE.

1,213,515.  Specification of Letters Patent.  Patented Jan. 23, 1917.

Application filed September 27, 1916. Serial No. 122,357.

*To all whom it may concern:*

Be it known that I, WILLIAM W. LOWER, a citizen of the United States, residing at Tyrone, in the county of Blair and State of Pennsylvania, have invented certain new and useful Improvements in Pressure Indicators and Valves; and I hereby declare that the following is a full, clear, and exact description thereof, reference being had to the accompanying drawings, which form part of this specification.

This invention is a novel pressure indicator and valve especially intended for use with pneumatic tires but applicable to other objects. Its object is to provide novel means whereby the amount of pressure in the tire or other object to which the device is applied, can be visually indicated, and the pressure increased or diminished to the desired extent.

With this invention when it is desired to inflate a tire the air supply tube is connected to the inlet of the device and as the compressed air goes into the tire the indicator gage will rise out of the valve stem; and when the desired amount of pressure is in the tire, the air tube can be disconnected, the indicator forced back into the stem, and by the replacement of the stem cap, thereby insuring sealing the valve and protecting the indicator.

I will explain the invention with reference to the accompanying drawings and summarize in the claims the essential features and combinations of parts which it is desired to protect.

In said drawings: Figure 1 is a sectional elevation of the indicator valve showing the parts in closed or sealed position. Fig. 2 is a similar view with the cap removed, and parts in position preparatory to admitting air into the tube. Fig. 3 is a view showing the cap removed and the indicator partly projected by the air pressure within the tube.

In the construction shown in the drawings, the device comprises a tubular stem 1 which resembles those commonly used for housing the valves of pneumatic tires for automobile wheels and the like; this stem is externally threaded and its inner end is screwed onto a nipple 2 provided with clamping members $2^a$, $2^b$, $2^c$, such as are commonly employed for connecting the stem to an inner tube, and need no particular description herein. The nipple 2 is provided with an axial passage $2^e$ for air, and at the outer end of this passage and within the stem 1 is a valve seat $2^f$. Screwed within the lower end of the stem, and above the nipple 2, is a bushing 3 which has a reduced inner portion $3^a$, preferably externally threaded for engagement with a spring 6. Within the stem, above the bushing 3, is slidably fitted an indicator 4, which is preferably slightly smaller in external diameter than the interior of the stem; and is also preferably tubular. Within the indicator, and near its upper end, is a valve seat $4^f$. The upper outer end of the indicator is reduced and externally threaded as at $4^a$ for engagement with an air tube or nozzle indicated at A in the drawings; this air tube being the usual type such as commonly employed for supplying compressed air to the stem.

To the lower end of indicator 4 is attached a piston or packing $5^a$, which may be secured to the stem by means of a tubular member 5 having a reduced threaded outer end $5^n$ screwed into the corresponding internally threaded lower end of the bore of indicator 4; said member 5 holding the packing firmly in place and forming therewith a valve on the inner end of the indicator which will prevent leakage or passage of air around the lower end of the indicator and between it and the stem 1. The part 5 also has its inner end reduced and externally threaded as shown at $5^b$. The parts 3 and 5 are yieldably connected preferably by means of a stout helical retractile spring 6 which may be conveniently attached to said members by screwing the ends of the spring onto the threaded portions $3^a$ and $5^b$ respectively as shown.

The upper end of the stem 1 may be contracted as at $1^e$ to make a close fitting joint with the exterior of the indicator, the indicator being guided by the portion $1^e$ and the piston $5^a$ in its movement longitudinally of the stem 1.

Extending through the stem, the indicator and nipple 2 is a valve rod 7 carrying a valve $2^v$ adapted to be forcibly seated on the seat $2^f$, when the parts are in the position shown in Fig. 1, to prevent back passage of air from the tube into the stem. This rod 7 also carries a valve $4^v$ which is adapted to engage seat $4^f$ when the parts are in the position shown in Figs. 2 and 3 and prevent escape of air from the stem through the indicator. The rod 7 is normally held in the position indicated in Fig. 2, by means of an expansion helical spring 7ᵇ interposed between the valve 4ᵛ and the part 5ⁿ of the member 5; but when air under greater pressure than that within the stem is admitted through pipe A it will unseat the valve 4ᵛ and pass on through the indicator and stem and nipple 2 into the tube. The air pressure in the tube and stem will react against piston 5ᵃ and tend to force the indicator 4 out of the stem 1, as indicated in Fig. 3, and the greater the air pressure the farther the indicator will be projected from the stem.

The projection of the stem is however opposed by the spring 6; which should be of sufficient strength, and the indicator may be provided with an external graduated scale, as indicated in Fig. 3, whereby the internal pressure will be shown, according to the projection of such indicator above the end of the stem.

After the desired amount of air has been supplied to the tube the pipe A is disconnected; and a cap 8 is placed over the outer end of the indicator and forced inward until it can be engaged with the end of the stem 1 onto which it is screwed as indicated in Fig. 1. As the cap is applied the indicator will be depressed against the action of the air and after the cap is engaged with the stem and screwed home the valve 4ᵛ will be unseated and the valve 2ᵛ will be seated as indicated in Fig. 1, thus positively preventing the escape of air through the valve.

The valves 2ᵛ, 4ᵛ may be of any desired suitable material and shape. The amount of air pressure in the tire at any time can be readily ascertained by simply removing the cap 8 and observing the extent to which the indicator 4 is projected by the air. Spring 7ᵇ normally acts to close the valve 4ᵛ and open valve 2ᵛ; while spring 6 tends to retract the indicator into the stem and resists the tendency of the air pressure in the tube to eject the indicator.

The stem and gage in the form shown are adapted for use in connection with pneumatic tires or vehicle wheels; and the parts 2, 2ᵃ, 2ᵇ, 2ᶜ are such as are commonly used in attaching the stem to the tube, and the nut or collar screwed onto the stem is such as is commonly employed in fastening the stem to the wheel rim.

When it is desired to inflate the tire, the cap 8 is removed and the air supply pipe A connected to the end 4ᵃ of the indicator and air admitted into the tube; as the air accumulates in the tube the indicator 4 will rise above or out of the stem 1 according to the pressure in the tube. When the desired amount of air is in the tube, as can be determined by the scale on the indicator, the air pipe is disconnected, and the indicator forced into the stem and secured by the cap 8 as indicated in Fig. 1.

What I claim is:

1. In a pressure indicator and valve, the combination of a tubular stem, means for attaching the stem to an object, a valve seat in the lower end of said stem, a slidable indicator adapted to be projected from the stem, means for preventing the escape of air between the indicator and stem, a valve seat near the outer end of said indicator, a spring for retracting the indicator within the stem, a rod extending through the indicator stem and valve seats; a valve on said rod adapted to close the seat in the indicator, a second valve on such rod adapted to close the seat in the stem when the rod is forced inward; and a spring for normally projecting the rod to close the valve seat in the indicator.

2. An indicator valve for pneumatic tires and the like, comprising a tubular stem having a valve seat adjacent one end, a tubular indicator telescoping into the upper end of said stem and having a valve seat near its outer end, a contractile spring having one end connected with the stem and its other end connected with the inner end of the indicator, a valve rod extending through the stem and indicator, and valves on said rod respectively adapted to close the seat in the stem and the seat in the indicator, and a spring for normally holding said rod so as to close the seat in the indicator and leave the seat in the stem open.

3. An indicator valve for the purpose specified, comprising a tubular stem having a valve seat adjacent its lower end, means for attaching the stem to an object, a tubular indicator telescoping the outer end of the stem and having a valve seat, means for preventing escape of air from the stem around the indicator, a helical spring having one end attached to the stem and the other to the indicator, a valve rod extending through the indicator and stem, valves on such rod respectively adapted to close the seat at the lower end of the stem and to close the seat in the indicator, a spring within the indicator normally causing said rod to seat the valve in the indicator, and a cap adapted to be screwed on the outer end of the stem over the indicator and valve rod, substantially as described.

4. An indicator valve for pneumatic tires and the like comprising a tubular stem, a tubular nipple connected with the lower end of said stem, a tubular indicator telescoping into the upper end of said stem, a valve seat in the stem, a valve seat in the indicator, a contractile helical spring having one end rigidly connected with the stem and its other end rigidly connected with the inner end of the indicator, a valve rod extending through the stem indicator and nipple, and valves on said rod respectively adapted to close the seat in the stem and the seat in the indicator, and a spring for normally holding said rod so as to close the seat in the indicator and leave the seat in the stem open.

5. An indicator valve for the purpose specified, comprising a tubular stem, means for attaching the stem to an object, a tubular member screwed into the lower end of said stem, a valve seat adjacent the tubular member at the lower end of the stem, a tubular indicator telescoping the outer end of the stem, a tubular member screwed into the inner end of the indicator, means for preventing escape of air from the stem around the lower end of the indicator, a helical spring having one end engaged with the tubular member attached to the stem and the other engaged with the tubular member attached to the indicator, a valve rod extending through the indicator tubular stem and tubular members, and valves on such rod respectively adapted to close the seat at the lower end of the tubular member and to close the seat in the indicator.

6. An indicator valve for the purpose specified comprising a tubular stem, means for attaching the stem to an object, a tubular member screwed into the lower end of said stem, a tubular nipple screwed to the stem and having a valve seat adjacent the tubular member, a tubular indicator telescoping the outer end of the stem, a tubular member screwed into the inner end of the indicator, means for preventing escape of air around the lower end of the indicator, a helical spring having one end engaged with the tubular member attached to the stem and the other engaged with the tubular member attached to the indicator, a valve rod extending through the indicator, nipple stem and tubular members, valves on such rod respectively adapted to close the seat at the lower end of the tubular member and the seat in the indicator; a spring within the indicator normally holding the valve therein against the seat in the indicator, and a cap adapted to be screwed on the outer end of the stem and over the end of the indicator and valve rod, substantially as described.

In testimony that I claim the foregoing as my own, I affix my signature.

WILLIAM W. LOWER.